United States Patent [19]
Veeravalli et al.

[11] Patent Number: 6,167,035
[45] Date of Patent: Dec. 26, 2000

[54] METHOD AN APPARATUS FOR DESIGNING SOFT HANDOFF REGIONS IN A WIRELESS COMMUNICATIONS SYSTEM

[75] Inventors: Venugopal Veeravalli, Ithaca, N.Y.; Andrew Sendonaris, Houston, Tex.; Nikhil Jain, Plano, Tex.; Seshu Madhava Peddy, Richardson, Tex.

[73] Assignee: Nortel Networks Corporation, Montreal, Canada

[21] Appl. No.: 08/987,512

[22] Filed: Dec. 9, 1997

[51] Int. Cl.⁷ ....................................................... H04Q 7/00
[52] U.S. Cl. ............................................. 370/331; 370/328
[58] Field of Search ..................................... 370/331, 334, 370/335, 336, 337, 328

[56] References Cited

U.S. PATENT DOCUMENTS 5,737,704  4/1998  Jin et al. ................................... 455/450

*Primary Examiner*—Valencia Martin-Wallace
*Assistant Examiner*—Kim T. Nguyen
*Attorney, Agent, or Firm*—John D. Crane; Felsman, Bradley, Vaden, Gunter & Dillon, LLP

[57] ABSTRACT

A method for designing a soft handoff region in a wireless communications system. An inner region having an outer edge defined by a first radius is selected, wherein a mobile station communicates only with the base station within the inner region and has a selected outage probability at the outer edge of the inner region. Next, a soft handoff region having an outer edge defined by a second radius and an inner edge defined by the first radius is selected, wherein the mobile station within the soft handoff region has the selected outage probability. Actual coverage region having an outer edge defined by a third radius, wherein the third radius is selected to match soft handoff regions of other cells adjacent to the cell.

21 Claims, 8 Drawing Sheets

METHOD AN APPARATUS FOR DESIGNING SOFT HANDOFF REGIONS IN A WIRELESS COMMUNICATIONS SYSTEM

BACKGROUND OF THE INVENTION

1. Technical Field

The present invention relates generally to an improved communications system and in particular to a method and apparatus for configuring a communications system. Still more particularly, the present invention relates to a method and apparatus for designing soft handoff regions in a wireless communications system.

2. Description of the Related Art

Many of the present digital telecommunications networks of the world are based on time-division multiple access (TDMA) and use transmission and switching products like digital switches and pulse coded modulation (PCM) transmission at E1 or T1 rates. TDMA users share the radio spectrum in the time domain. An individual user is allocated a time slot and, during this time slot, the user accesses the whole frequency band allocated to the system (wideband TDMA) or only a part of the band (narrow band TDMA). In TDMA, transmission take place in bursts from a mobile station to a base station in an uplink path with only one user transmitting to the base station at any given time. In the downlink path from the base station to the mobile station, the base station usually transmits continuously with the mobile station listening only during the assigned time slot. TDMA channel multiplexes the bids from a number of users. This type of system requires transmission at a higher bit rate over a radio frequency channel.

Another technology that is becoming more widely used is code-division multiple access (CDMA) in a spread spectrum. Spread spectrum techniques spread the bandwidth of the transmitting signal over a spectrum or band of frequency much larger than the minimal band with required to transmit the signal. CDMA has an ability to lock out conflicting signals, which may allow it to share a system with other radio signals without interference.

Wireless technology is an important component of the global information infrastructure. To exploit the full potential of this technology, regulators and administrators of all countries are re-evaluating their spectrum allocation policy. A large segment of the spectrum around two GHz bandwidths has already been released for the use of wireless networks. More spectrum is being allocated by the International Telecommunications Union (ITU) and countries like the United States of America and Canada around the 7–10 Ghz range to use wireless technology for broadband wireless applications. Wireless networks are being built all over the world to handle a large volume of traffic and mobility.

When a mobile station moves between cells, a handoff occurs, a process that allows a call in progress to continue as the mobile station moves between cells. Handoffs may be based on received signal strength or signal-to-interference ratio (measured either at the terminal, the mobile station, or both) or may be based on network resources management needs, such as, for example, a forced handoff to free resources to allow an emergency call to be placed. Handoffs can be classified as soft or hard. A soft handoff occurs when the mobile station call is passed to a target base station without interrupting communications with the current base station serving the call. In a soft handoff, the mobile station communicating with two or more base stations simultaneously with the signals from the base stations to the mobile station being treated as multiple path signals that is what coherently combined at the mobile station. A hard handoff occurs when the communication to the mobile station is passed between disjointed radio systems, different frequency assignments, or different air interface characteristics or technologies.

Within wireless cellular communications systems, the architecture seeks to provide an efficient use of available channels by using low-power transmitters to allow frequency reuse. Wireless cellular communications systems are designed to operate with groups of low-power radios spread out over the geographical service area. Each group of radios serves mobile stations presently located near them. The area served by each group of radios is called a "cell". The power transmitted is chosen to be large enough to communicate with mobile stations located near the edges of the cell. The radius of the cell may be chosen to be, for example, 26 kilometers in a start up system with relatively few subscribers and down to less than 2 kilometers for a mature system requiring considerable frequency reuse. As the traffic grows, new cells and channels are added to the system. In the designing of cells, however, no design criteria or methodology are present determining soft handoff regions for a particular cell.

Therefore, it would be advantageous to have an improved method and apparatus for designing and implementing soft handoff regions in cells in a communications system.

SUMMARY OF THE INVENTION

The present invention provides a method for designing a soft handoff region in a wireless communications system. An inner region having an outer edge defined by a first radius is selected, wherein a mobile station communicates only with the base station within the inner region and has a selected outage probability at the outer edge of the inner region. Next, a soft handoff region having an outer edge defined by a second radius and an inner edge defined by the first radius is selected, wherein the mobile station within the soft handoff region has the selected outage probability. Actual coverage region having an outer edge defined by a third radius, wherein the third radius is selected to match soft handoff regions of other cells adjacent to the cell.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Environment

Figure 1:
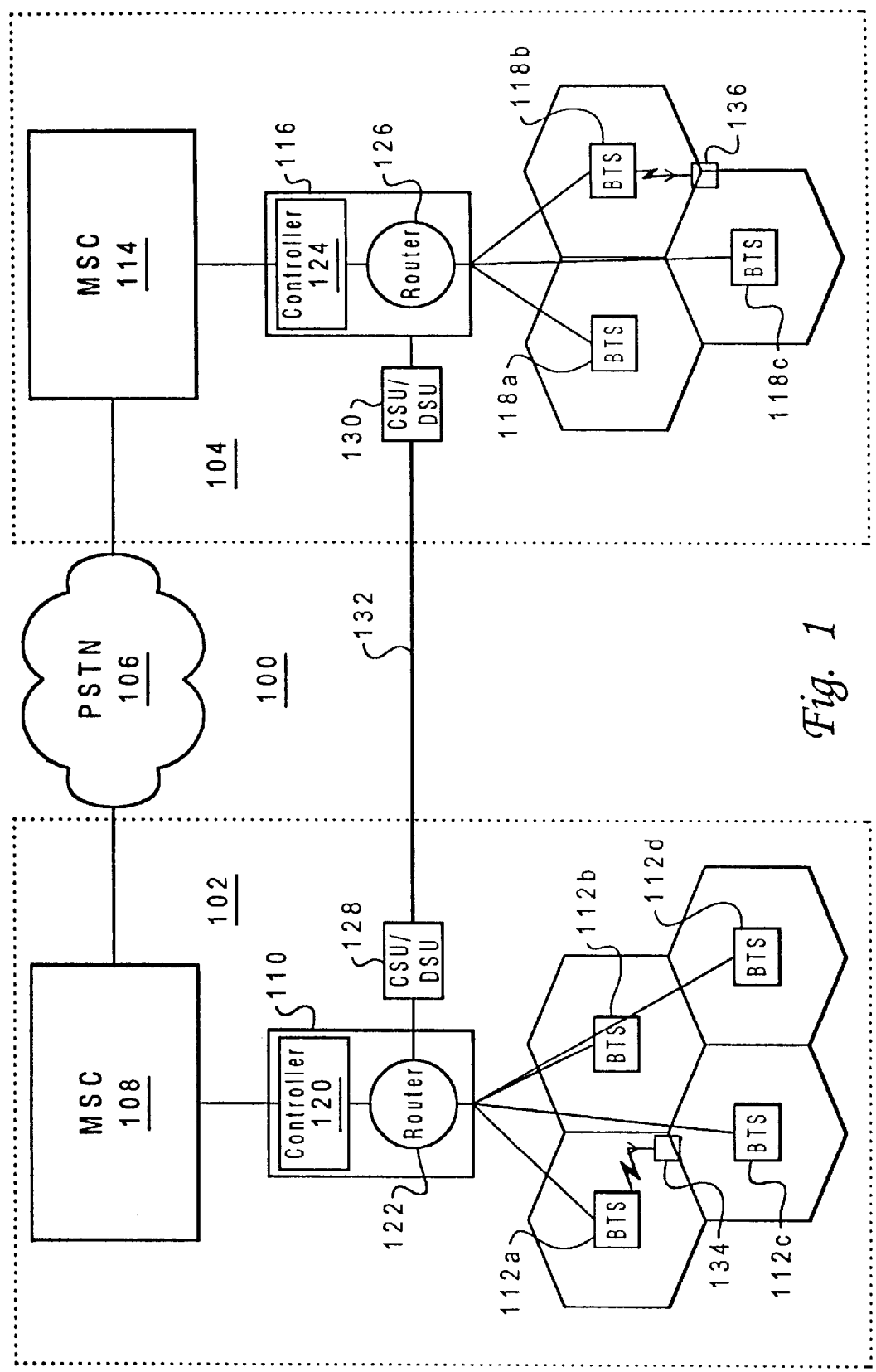
FIG. 1 is a block diagram of a communications system according to the present invention.

With reference now to the figures and in particular with reference to FIG. 1, a communications system 100 is depicted according to the present invention. Communications system 100 includes multiple cellular systems covering a geographical region. In particular, communications system 100 includes wireless communications systems in the form of cellular system 102 and cellular system 104. In the interest of clarity, FIG. 1 depicts only two such cellular systems. In addition, also depicted in communications system 100 is a public switch telephone network (PSTN) 106. Cellular systems 102 and 104 are CDMA wireless communications systems in the depicted example.

Cellular system 102 includes a mobile service switching center (MSC) 108, a base station controller (BSC) 110 with a number of base transceiver stations (BTS) 112a–112d. Similarly, cellular system 104 includes a MSC 114, a BSC 116, with BTSs 118a–118c. BSC 110 includes a controller 120 and a router 122. BSC 116 also includes a controller 124 and a router 126. Router 122 is connected to channel service unit/data service unit (CSU/DSU) 128 while router 126 is connected to CSU/DSU 130. Communications link 132 connects CSU/DSU 128 to CSU/DSU 130. Also illustrated in FIG. 1 are mobile stations 134 and 136. These mobile stations are also called "mobile communications units" and may be for example, a cellular phone. For reference with subsequent discussions, the cellular system initially communicating with a mobile station is called the source system (cellular system 102) and the cellular system that contains a mobile station, 136, is the target cellular system (cellular system 104). Each of the entities also may be referred to as a source or target, such as for example, source MSC or target MSC. CSU/DSU 128 and CSU/DSU 130 provide a T1 link interface/termination to provide a T1 link between router 112 and router 126 in the depicted example. MSC 108 and MSC 114 are coupled to PSTN 106 through a T1 line that is well known in the art. In the depicted example, the T1 line is a Northern American standard signal line. The international standard E1 can be used in the same manner. The signal line conducts a pulse code modulated (PCM), 24 channel, serial signal between PSTN 106 and MSCs 108 and 114. MSCs 108 and 114 perform switching of a call from PSTN 106 to the appropriate cellular system and vice versa. These MSCs also validate a subscriber mobile station to determine if the subscriber is resident of the system or a roamer by using home location register/visitor location register (HLR/VLR) databases of mobility networks. Controllers 120 and 124 include coders (not shown), which transform signals from one type of digital representation to another. For example, a coder may be employed to transform a 64 kbps PCM speech signal to a lower signal rate such as 13 kbps or 8 kbps. Vocoders are discussed in greater detail in IS-96A and are well known in the art. The function of encoding and decoding data packets is called "vocoding". Encoding occurs when 64 kbps PCM data is received and encoded into variable rate packets at 8 to 13 kbps. Decoding occurs when data packets are received from router 126 at 8 or 13 kbps and decoded into 64 kbps. The terms "transcoder" and "transcoding" are interchangeable with "vocoder" and "vocoding." The controllers also perform echo cancellation on the forward link PCM data as it is received from the MSC.

Routers 122 and 126 are well known in the art and in the depicted example include multiple input/output ports with each port being assigned an address range. In particular, routers 122 and 126 are CDMA interconnect systems that perform packet routing through the wireless networks.

Figure 2:
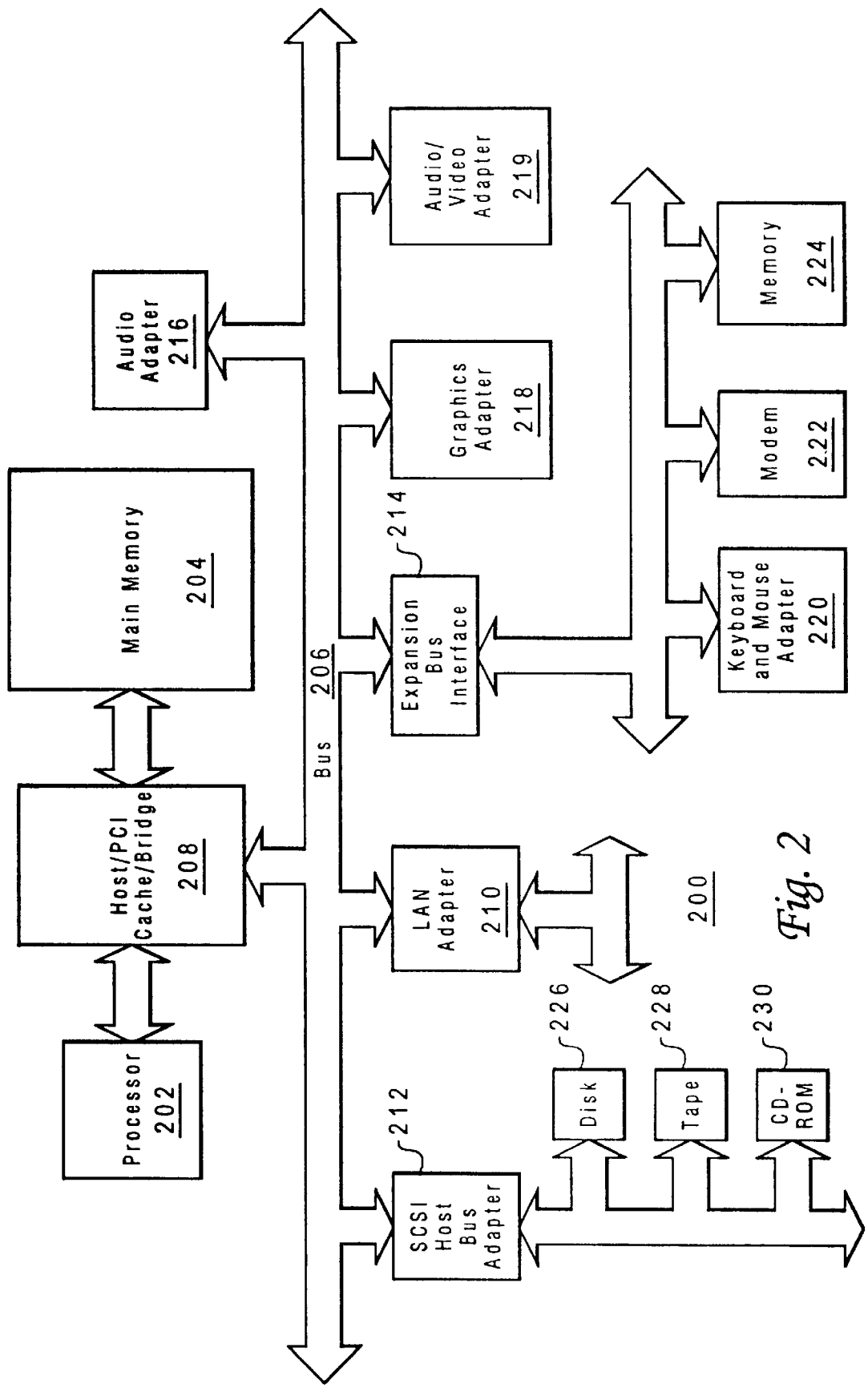
FIG. 2 is a block diagram of a data processing system in the present invention may be implemented.

With reference now to FIG. 2, a block diagram of data processing system 200 in which the present invention may be implemented is illustrated. The processes of the present invention may be implemented within data processing system 200 to design cells for use in a communications system such as communications system 100 in FIG. 1.

Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM 230 in the depicted example. Typical PCI local bus implementations will support three or four PCI expansion slots or add-in connectors. The depicted example includes four loads on the mother board and three expansion slots. Those of ordinary skill in the art will appreciate that the hardware in FIG. 2 may vary. For example, other peripheral devices, such as optical disk drives and the like may be used in addition to or in place of the hardware depicted in FIG. 2. The depicted example is not meant to imply architectural limitations with respect to the present invention.

Cell Architecture

Figure 3:
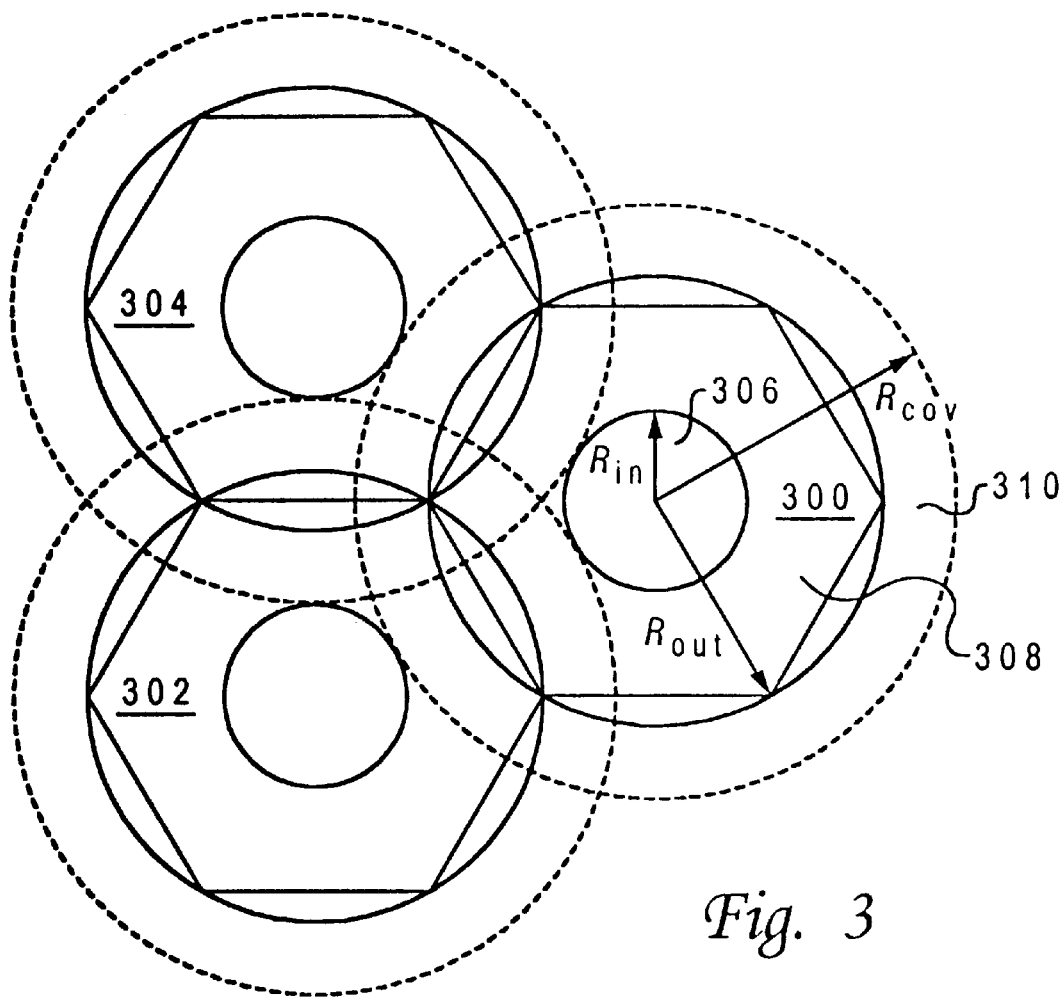
FIG. 3 is a diagram illustrating various regions of cells designed in accordance with a preferred embodiment of the present invention.

With reference now to FIG. 3, a diagram illustrating various regions of cells designed is depicted in accordance with a preferred embodiment of the present invention. It is assumed that a requirement on the outage probability $P_{out}$ is specified and that the goal is to ensure that all points in the cell meet this requirement. In FIG. 3, three cells, 300, 302, and 304 are illustrated in accordance with the preferred embodiment of the present invention. These cells are omni cells. Cell 300 has an inner region 306 defined by an inner cell radius $R_{in}$ in which a mobile station (not shown) within cell 300 communicates only with the base station associated with cell 300. Cell 300 also includes soft handoff region 308 having an outer edge defined by outer cell radius $R_{out}$. The outage probability $P_{out}$ is largest at the outer edge of soft handoff region 308. Finally, cell 300 has an actual coverage region 310 defined by having an outer edge defined by radius $R_{cov}$. Coverage region 310 is set by the distance from a pilot, located at the center of cell 300, associated with the base station for cell 300. The radius $R_{cov}$, defining the coverage of a cell, is directly related to the pilot for the cell. On a statistical basis, the likelihood that a mobile station will be in a soft handoff mode within inner region 306 in cell 300 is very small. The largest number of mobile stations in a soft handoff mode are found in soft handoff region 308. For example, a mobile station located in soft handoff region 308 moving towards cell 302 into actual coverage region 310 in cell 300 or between soft handoff region 308 and actual coverage region 310 will link to the pilot within cell 302 better than the pilot in cell 300. As the mobile station moves closer to the center of cell 302, the outage probability $P_{out}$ decreases with respect to cell 300 or cell 302. Cells 302 and 304 contain similar regions and are designed using radii $R_{in}$, $R_{out}$, and $R_{cov}$.

In accordance with a preferred embodiment of the present invention, the inner radius, $R_{in}$, of a cell is selected such that the outage probability at a distance $R_{in}$ from the base station is $P_{out}$ when the mobile station is communicating only with this base station. This cell radius selection will guarantee that the outage probability is smaller than $P_{out}$ over the entire inner circle, forming inner region 306, which represents a no-soft-handoff region.

In the exterior of the inner circle, the outage probability condition can be met by allowing soft handoff with other base stations. The outer cell radius $R_{out}$ is hence designed such that the maximum outage probability between the edge of the cell the inner circle (i.e., soft handoff region 308) is $P_{out}$. Note that the maximum outage probability could happen either on the middle of one of the edges of the hexagon or at one of the cell corners in cell 300. Finally, the actual pilot coverage $R_{cov}$ (actual coverage region 310) of a cell is chosen to match the soft handoff regions of its neighboring cells.

Cell Coverage Calculations

Figure 4:
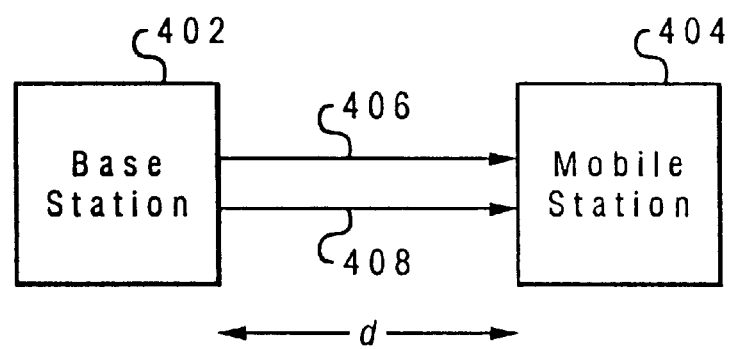
FIG. 4 is a block diagram of communications between a mobile station and a cell repeater in accordance with a preferred embodiment of the present invention.

With reference now to FIG. 4, a block diagram of communications between a mobile station and a cell repeater in accordance with a preferred embodiment of the present invention is depicted. Base station 402 may be the base station for any cell depicted in FIG. 1. The signal path from cell base station 402 to a mobile station 404 located a distance d away from base station 402 includes a forward link or channel 406 and a reverse link or channel 408 through an air interface between base station 402 and mobile station 404. As mobile station 404 moves away from base station 402, the transmit power requires to maintain the desired frame error rate (FER) increases. The transmitted power of mobile station 404, $S_{trans}$, which is controlled by the reverse link power control loop, is limited to a value $S_{max}$. It may be assumed that the condition for call outage is that the required $S_{trans}$ for a base station to acceptably service a mobile station exceeds $S_{max}$. The transmitted power $S_{trans}$ of a mobile station is given by:

$$S_{trans} = S + PL(d) + Z$$

where both S and $S_{trans}$ are expressed in terms of decibel Watts (dB-W), S is the received power at the base station, PL(d) is the path loss at a distance d from the base station, including antenna gains, and Z is a random variable representing shadow fading.

Figure 5:
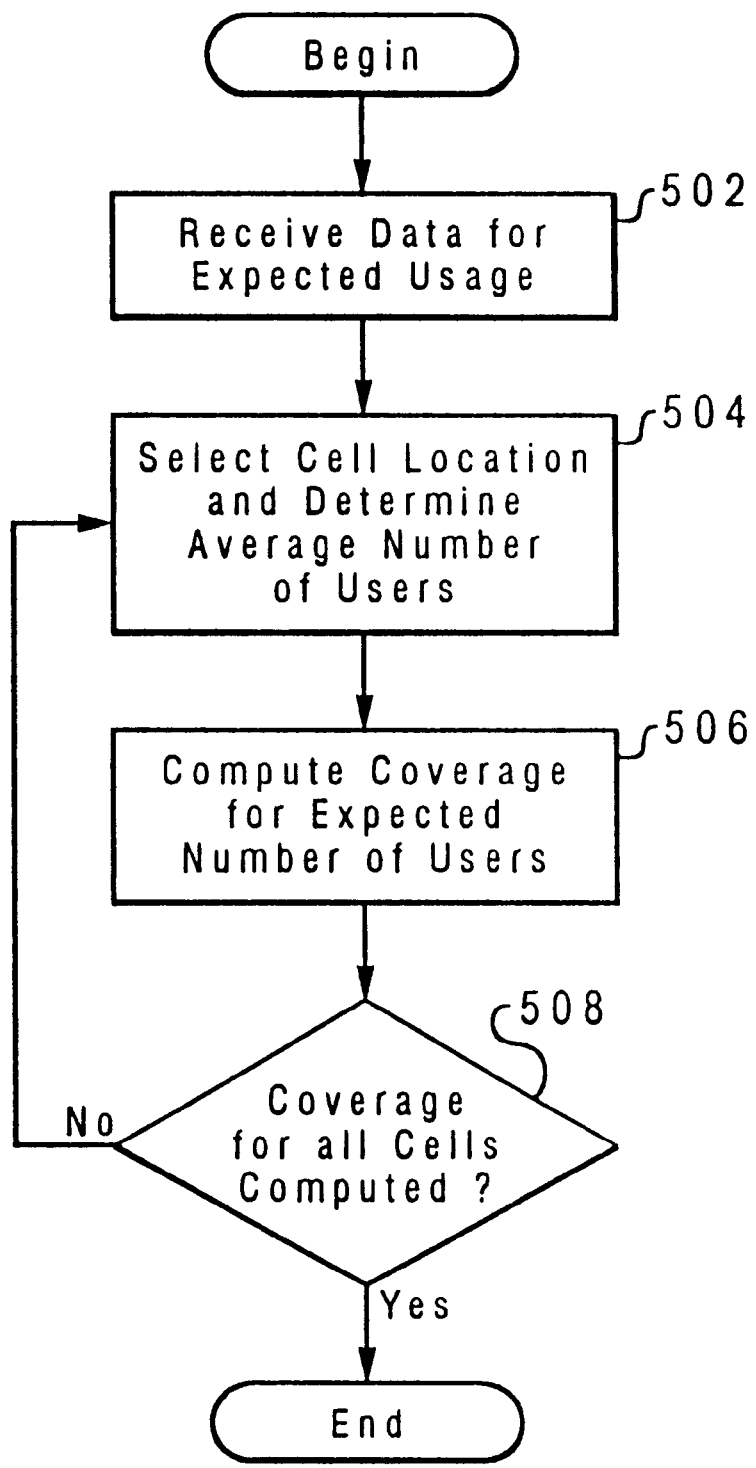
FIG. 5 is a high level flowchart for accurately calculating coverage of a cell within a CDMA wireless digital communications network as a function of capacity in accordance with a preferred embodiment of the present invention.

Referring now to FIG. 5, a high level flowchart for accurately calculating coverage of a cell within a CDMA wireless digital communications network as a function of capacity in accordance with a preferred embodiment of the present invention is illustrated. The cell coverage determined by the depicted process may be employed to define cell locations and boundaries for the cells of a network such as that depicted in FIG. 1. The process begins by receiving data regarding expected usage within the region of the CDMA network (step 502). Such data may come from a variety of sources, such as monitoring existing wireless networks in the area and/or marketing data. Next, a selection of a cell location within the CDMA network and a determination the average number of users for the area of that cell location is performed (step 504).

The coverage for the expected average number of users in the cell region is computed (step 506), which is described in more detail below. In the equations below, where any variable X representing power or signal-to-noise ratio (SNR) in decibels (dB), the notation $\hat{X}$ is employed to denote the computation of $10^{X/10}$ for that power or SNR variable.

The probability of outage at a distance d from a base station is given by $$\text{Prob}(S + PL(d) + Z > S_{max})$$

where S is the required received power at the base station for maintaining FER for the intended user, and $S_{max}$ is the limit of transmitted power from the mobile station as defined by the reverse link power control loop. If a model such as Hata's model is assumed for the path loss, $PL(d) = K_1 + K_2 \log d$. The shadow fading variable $Z \sim \text{Gaussian}(0, \sigma_Z^2)$ The term $\sigma_Z^2$ is used to denote a measure of the variance of the shadow fading process.

The equation above implies that the coverage $R_{cov}$ of the cell is obtained as a solution to:

$$\text{Prob}(S + PL(R_{cov}) + Z > S_{max}) = P_{out} \tag{1}$$

where $P_{out}$ is the desired outage probability at the edge of the cell. In equation (1) above, the only quantity which depends upon the number of users in the system is the required received power at the base station, S. Thus, a relationship between coverage and the number of users c in a system may be derived if the distribution of the base station required received power S as a function of the number of users c may be found.

The signal-to-noise ratio for the intended user at the base station may be expressed in terms of the received powers of the various users, as:

$$\hat{\varepsilon} = \left(\frac{\hat{E}_b}{I_0}\right)_{req} = \frac{\frac{\hat{S}}{R}}{\sum_{i=1}^{k-1} \frac{v_i \hat{S}_i}{W} + N_0} \tag{2}$$

where $\hat{\varepsilon}$ is the required SNR for maintaining a desired FER for a user, $\hat{E}_b$ is energy per bit, $I_0$ is interference energy density, R is the information bit rate in bits per second, $\hat{S}$ is the received power required at the base station for maintaining FER for the user of interest, k is the effective number of users seen by the base station, $\hat{S}_i$ is the received power required at the base station for maintaining FER for another user i, $v_i$ is the voice activity factor of the i-th user in the system, W is the system bandwidth, and $N_0$ is the background thermal noise density within the cell. The effective number of users $k \sim \text{Poisson}(c(1+f)|(k \geq 1))$, where c is the average number of users in a cell and f is the other-cell interference factor for a cell. The voice activity factor $v_i \sim \text{Bernoulli}(\rho)$.

If it is assumed that all users are being maintained at the same FER on average, then it is clear that $\hat{S}, \hat{S}_1, \hat{S}_2, \ldots, \hat{S}_{k-1}$ are all independent, identically distributed (i.i.d.) random variables. Furthermore, it has been observed in field trials that imperfect power control and variations due to fading cause the required SNR $\hat{\epsilon}$ to fluctuate randomly with log-normal first order statistics. These field trials have therefore shown that $\hat{\epsilon}$ is log-normal, which means that $\epsilon=10 \log \hat{\epsilon}$ is Gaussian with mean $m_\epsilon$ and standard deviation $\sigma_\epsilon$. Typical values for the mean $m_\epsilon$ and standard deviation $\sigma_\epsilon$ of $\epsilon$ are $m_\epsilon = 7$ Db and $\sigma_\epsilon = 2.5$ dB. Therefore, if the terms $m_{\hat{\epsilon}}$ and $\delta_{\hat{\epsilon}}$ may be used to denote the mean and second moments, respectively, of $\hat{\epsilon}$, it may be shown that $$m_{\hat{\epsilon}} = \exp\left(\frac{(\beta\sigma_\epsilon)^2}{2}\right)\exp(\beta m_\epsilon)$$

and $$\delta_{\hat{\epsilon}} = \exp(2(\beta\delta_\epsilon)^2)\exp(2\beta m_\epsilon)$$

where $\beta = 10 \log_e 10$.

Equations for all of the moments of $\hat{S}$ may thus be obtained by taking expectations of appropriate powers in equation (2) above. A moment analysis using four moments reveals that $\hat{S}$ is very well approximated by a log-normal random variable. Thus, only the mean and second moment of $\hat{S}$ need to be calculated. These are given by:

$$m_{\hat{S}}(c) = \frac{N_0 W m_{\hat{\epsilon}}}{\frac{W}{R} - \rho\left(\frac{c(1+f)}{1-e^{-c(1+f)}} - 1\right)m_{\hat{\epsilon}}} \quad (3)$$

and $$\delta_{\hat{S}}(c) = \frac{\left[\left(N_0 W + \rho\left(\frac{c(1+f)}{1-e^{-c(1+f)}} - 1\right)m_{\hat{\epsilon}}\right)^2 + \rho^2\left(1 - \frac{(c(1+f))^2 e^{-c(1+f)}}{(1-e^{-c(1+f)})^2}\right)m_{\hat{S}}^2\right]\delta_{\hat{\epsilon}}}{\left(\frac{W}{R}\right)^2 - \rho\left(\frac{c(1+f)}{1-e^{-c(1+f)}} - 1\right)\delta_{\hat{\epsilon}}}$$

where $\rho$ is the voice activity factor for each user. When $c$ is larger than 1, the above simplifies to $$\delta_{\hat{S}}(c) \approx \frac{[(N_0 W + \rho(c(1+f) - 1)m_{\hat{\epsilon}})^2 + \rho^2 m_{\hat{S}}^2]\delta_{\hat{\epsilon}}}{\left(\frac{W}{R}\right)^2 - \rho(c(1+f)-1)\delta_{\hat{\epsilon}}}.$$

Since $\hat{S}$ is log-normal, $S$ is Gaussian and the mean and variance of $S$ may be easily calculated in terms of $m_{\hat{\epsilon}}$ and $\delta_{\hat{\epsilon}}$ as given below:

$$m_S(c) = 2\log m_{\hat{S}}(c) - \frac{1}{2}\log \delta_{\hat{S}}(c)$$

and $$\sigma_S^2(c) = \frac{\log \delta_{\hat{S}}(c) \log e}{20} - \frac{m_{\hat{S}}(c) \log e}{10}.$$

In order to evaluate the probability on the left hand side of equation (1) above, the joint statistics of $S$ and $Z$ must be determined. Because the means and variances of these variables have been specified, all that remains to be determined is the correlation between the two variables. Fluctuations in the required received power $S$ are mainly due to multipath fading and imperfections in power control. Fluctuations in $Z$, on the other hand, are due to shadow fading. Therefore, it may be argued that the correlation between $S$ and $Z$ is close to zero, and equation (1) above may be rewritten as:

$$Q\left(\frac{S_{\max} - (K_1 + K_2 \log R_{cell}) - m_S(c)}{\sqrt{\sigma_S^2(c) + \sigma_Z^2}}\right) = P_{out}, \quad (4)$$

where $Q$ is the well-known Q-function related to error probability. From equation (4), the following explicit equation relating coverage $R_{cov}$ to the average number of users $c$ may be obtained:

$$\log R_{cov} = \frac{S_{\max} - \left(\sqrt{\sigma_S^2(c) + \sigma_Z^2}\right)Q^{-1}(P_{out}) - m_S(c) - K_1}{K_2}. \quad (5)$$

The mean of a log-normal random variable is always positive. Thus it is clear from equation (3) above that, for a given set of system parameters, $c$ may not exceed the value for which the denominator of equation (3) equals zero. The parameter $C_{pole}$ may therefore be defined to denote the value of $c$ for which the denominator of equation (3) is zero, which is $$c_{pole} = \frac{\left(\frac{W}{Rm_{\hat{\epsilon}}\rho} + 1\right)}{1+f}.$$

As $c$ approaches $C_{pole}$, the mean $m_S(c)$ approaches infinity. This implies that $M_s(c)$ also approaches infinity, which further implies that $R_{cov}$ approaches zero. This demonstrates that $C_{pole}$ is the limit on the average number of users which the system can support, and also that $C_{pole}$ is achieved when the coverage of the cell is allowed to shrink to zero. This limit may be defined as the pole capacity of the system. It is noteworthy that this upper limit on $c$ is applicable regardless of the admission policy employed.

Once the cell coverage has been computed based on expected average number of users for the cell region, the process then determines whether the coverage for all cells in the network have been computed (step 508). If coverage for all of the cells in the network have not been computed, the process returns to step 504 for selection of another cell location within the network. If the coverage for all the cells have been computed, the process then terminates.

The process has been described in the context of selecting boundaries for cells within a wireless communications system. However, within an existing digital communications network, the equations derived above may be applied to the calculation of a probability of outage for a mobile station within a given cell having a known or measurable average number of users. Equation (4) may be utilized with the distance $d$ of the mobile station from the base transceiver station for the cell within which the mobile station is operating being substituted for the radius of the cell $R_{cov}$. The remainder of equation (4) may be utilized as written for an accurate calculation of the probability of outage.

Cell Region Design

Figure 6:
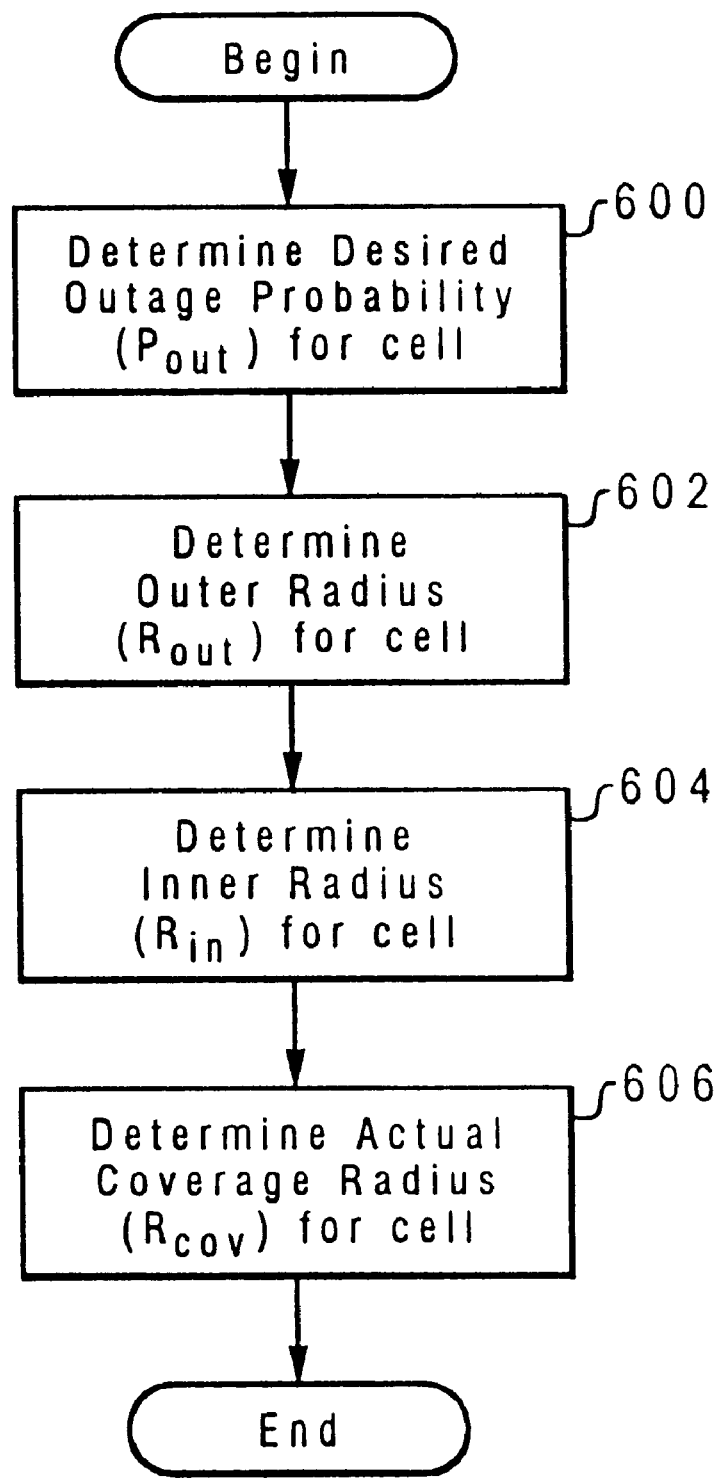
FIG. 6 is a high level flowchart of a process for designing cells in a communications system in accordance with the preferred embodiment of the present invention.

With reference now to FIG. 6, a high level flowchart of a process for designing cells in a communications system is depicted in accordance with the preferred embodiment of the present invention. This process is used to select actual coverage and soft handoff regions in a cell as a function of the number of users in the cell. The process begins by determining the desired outage probability ($P_{out}$) for a cell (step 600). The inner cell radius $R_{in}$ is used to define an inner region for the cell being designed. An inner cell radius $R_{in}$ calculated for the cell using the outage probability $P_{out}$ (step 602). An outer cell radius $R_{out}$ is determined for the cell (step 604). The outer cell radius $R_{out}$ is used to define a soft handoff region for the cell. Radius $R_{out}$ is selected such that $P_{out}$ is met at the edge of the region defined by radius $R_{out}$. Additionally, $R_{out}$ is selected such that the soft handoff region meets or overlaps all of the inner regions, defined by $R_{in}$, in adjacent cells. Overlaps typically occur if uneven cells are being designed for the communications system. Then, the actual coverage radius ($R_{cov}$) is determined for the cell (step 606). The actual coverage radius is employed to determine the actual coverage region for the cell. The parameters and a detailed description of the calculations for these radii of a cell are described in more detail below.

The required received power at a base station BS j at which transmissions from a mobile station is being received is denoted by $S^{(j)}$. In particular, $S^{(j)}$ is a random variable whose distribution depends on the traffic seen by cell j. Further, the distance to base station BS j is denoted by $d_j$ and the shadow fading on the link to base station BS j is denoted by $Z_j$.

The outage probability for two-way soft handoff is given by $$\supset (S^{(1)}-G+PL(d_1)+Z_1 > S_{max}, S^{(2)}-G+PL(d_2)+Z_2 > S_{max}) = P_{out} \quad (6)$$

and for three-way soft-handoff is given by $$Prob \begin{pmatrix} S^{(1)} - G + PL(d_1) + Z_1 > S_{max} \\ S^{(2)} - G + PL(d_2) + Z_2 > S_{max} \\ S^{(3)} - G + PL(d_3) + Z_3 > S_{max} \end{pmatrix} = P_{out} \quad (7)$$

where $PL(d)=K_1+K_2\log_{10}d$ is the path loss at distance d, assuming a Hata model, G is a constant representing various gains and losses, such as antenna gains, building penetration factors, etc., and $S_{max}$ is the maximum allowable transmit power for a mobile. Equations (6) and (7) are similar to equation (1) except a constant G has been added to represent various gains and losses. Equations (6) and (7) are used to determine the soft handoff regions.

A correlation model is employed in designing a cell. In particular, for a link to base station j, the random variable $S^{(j)}+Z_j$ is Gaussian with mean $m_s^{(j)}(c)$ and variance $\sigma^2_{s^{(j)}}(c)+\sigma^2_{Z_j}$, where c is the average number of users in cell j.

$S^{(j)}+Z_j$ can be written as follows:

$$S^{(j)}+Z_j=m_s(j)(c)+X_j$$

where $X_j \sim Gaussian(0, \sigma^2_s(C)+\sigma^2_z)$. The following model for the correlation between the $X_j$'s which is given in A. J. Viterbi, et al, "Other-Cell Interference in Cellular Power-Controlled CDMA", *IEEE Transactions on Communications*, Vol. 42, No. 2/3/4, pp. 1501–1504, February 1994.

$$X_j = a\xi + b\xi_j,$$

where, $\xi$, $\xi_1$ and $\xi_2$ are independent Gaussian $(0, \sigma^2_s(C)+\sigma^2_z)$ By using this model it can be shown that $$P_{out} = \int_{-\infty}^{\infty} \left[ Q\left( \frac{1}{\sqrt{1-a^2}}\varphi - \frac{a}{\sqrt{1-a^2}}x \right) \right]^{DSH} \frac{1}{\sqrt{2\pi}} e^{\frac{x^2}{2}} dx \quad (8)$$

where DSH is the degree of soft handoff (i.e. DSH=1, 2 or 3), and $$\varphi = \frac{S_{max} + G - K_1 - K_2\log_{10}d - m_S(c)}{\sqrt{\sigma^2_S(c) + \sigma^2_Z}} \quad (9)$$

in which $K_1-K_2\log_{10}d$ is the path loss at distance d, $S_{max}$ is the maximum transmission power of the mobile station, G is a constant representing various gains and losses, $m_s(c)$ is the mean of S, $\sigma^2_S(c)$ is the variation of S, and $T^2_z$ is a measure of the variance of the shadow fading process. Equation (9) can be rewritten as $$d = 10^{\frac{S_{max}+G-K_1-m_S(c)-\varphi\sqrt{\sigma^2_S(c)+\sigma^2_Z}}{K_2}} \quad (10)$$

Therefore, given a shadow fading correlation $a^2$ and a degree of soft handoff DSH, equation (8) can be used to obtain the $\phi$ that results in the desired $P_{out}$. Then this $\phi$ can be used in equation (10), to provide the coverage of the cell versus c, i.e. the average number of users in the cell.

Equations (8)–(10) are used to calculate $R_{in}$, $R_{out}$, $R_{cov}$, and soft handoff percentages. First, $R_{in}$ is determined by using the procedure described in the previous section, with DSH=1. That is, $$R_{in}=d_{DSH=1}$$

Using the procedure described in the previous section with DSH=2 and DSH=3 results in $d_{DSH=2}$ and $d_{DSH=3}$, respectively. From FIG. 3, the worst point for 2-way soft handoff occurs at a distance which equals $$\frac{\sqrt{3}}{2} R_{out},$$

and the worst point for 3-way soft handoff occurs at a distance which equals $R_{out}$. Therefore, $$R_{out}^{DSH=2} = \frac{2}{\sqrt{3}} d_{DSH=2}$$

and $R_{out}^{DSH=3}=d_{DSH=3}$. One of these two values will be the limiting factor, i.e.

$$R_{out} = \min\left( \frac{2}{\sqrt{3}} d_{DSH=2}, d_{DSH=3} \right)$$

Simple geometry then gives us the following $$R_{cov}=\sqrt{3}R_{out}-R_{in}$$

Total Percentage of mobiles in a soft handoff region is given by $$1 - \frac{2\pi}{3\sqrt{3}} \left(\frac{R_{in}}{R_{out}}\right)^2$$

Results

Figure 7:
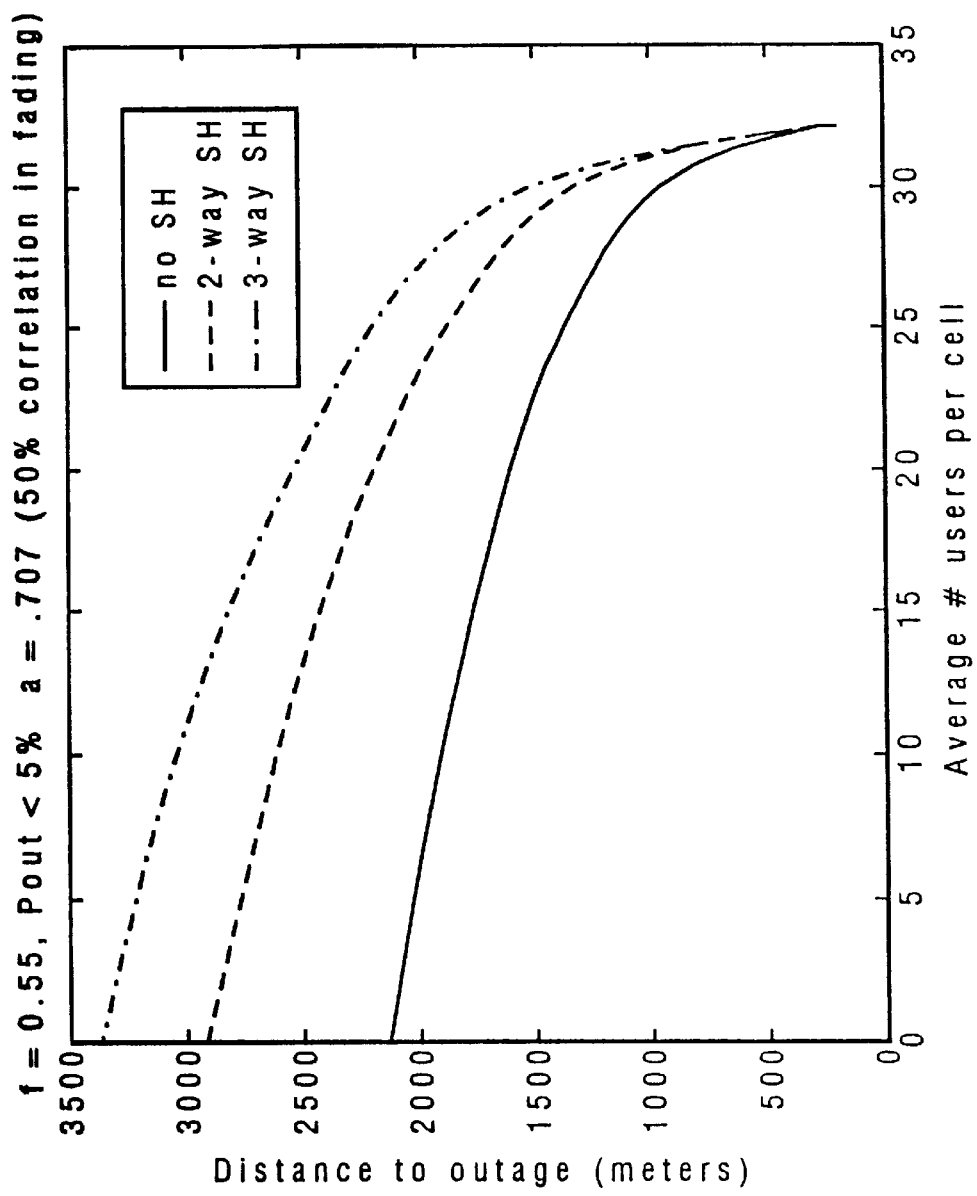
FIGS. 7–9 are diagrams illustrating results from cells designed in accordance with a preferred embodiment of the present invention.
Figure 8:
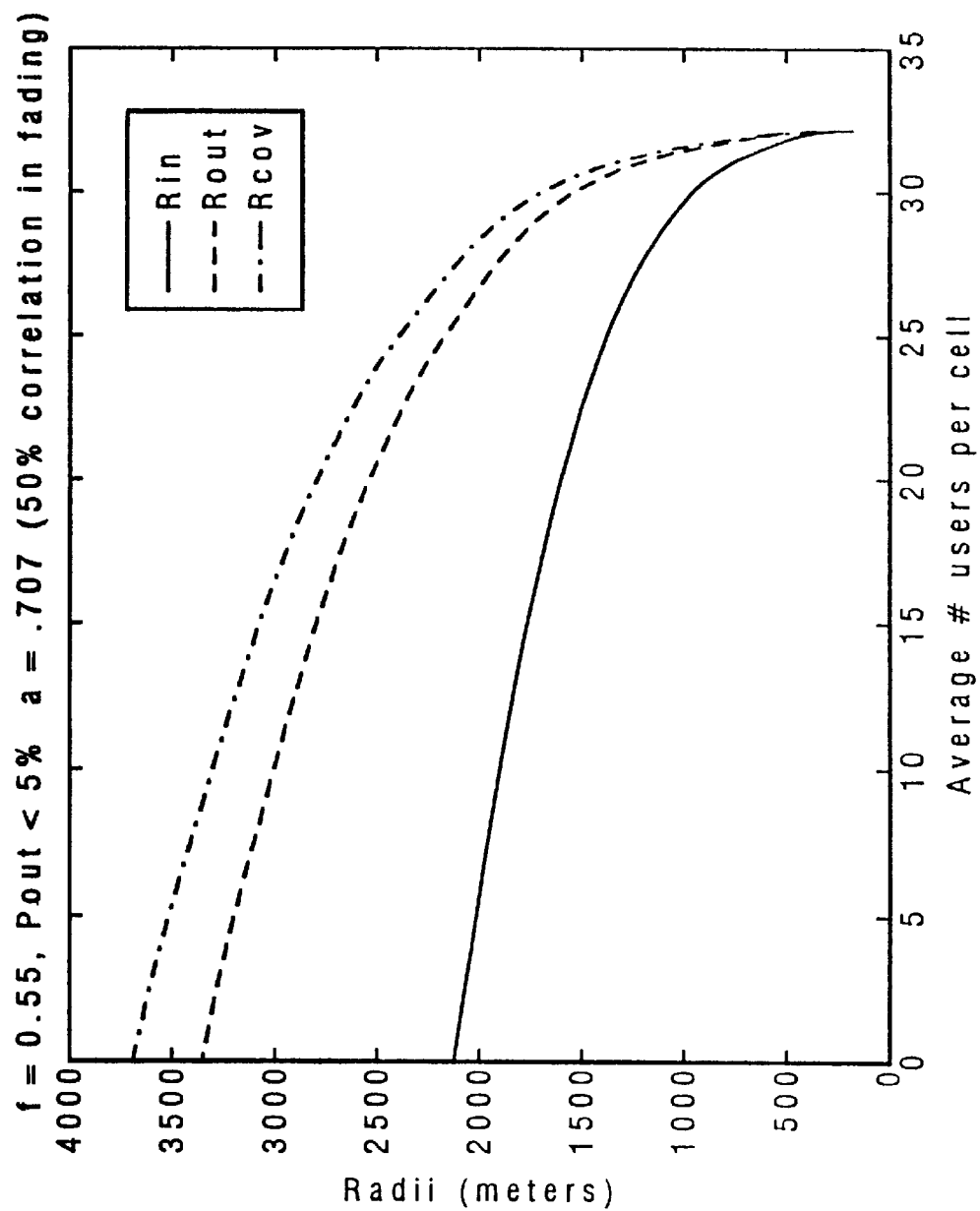
Figure 9:
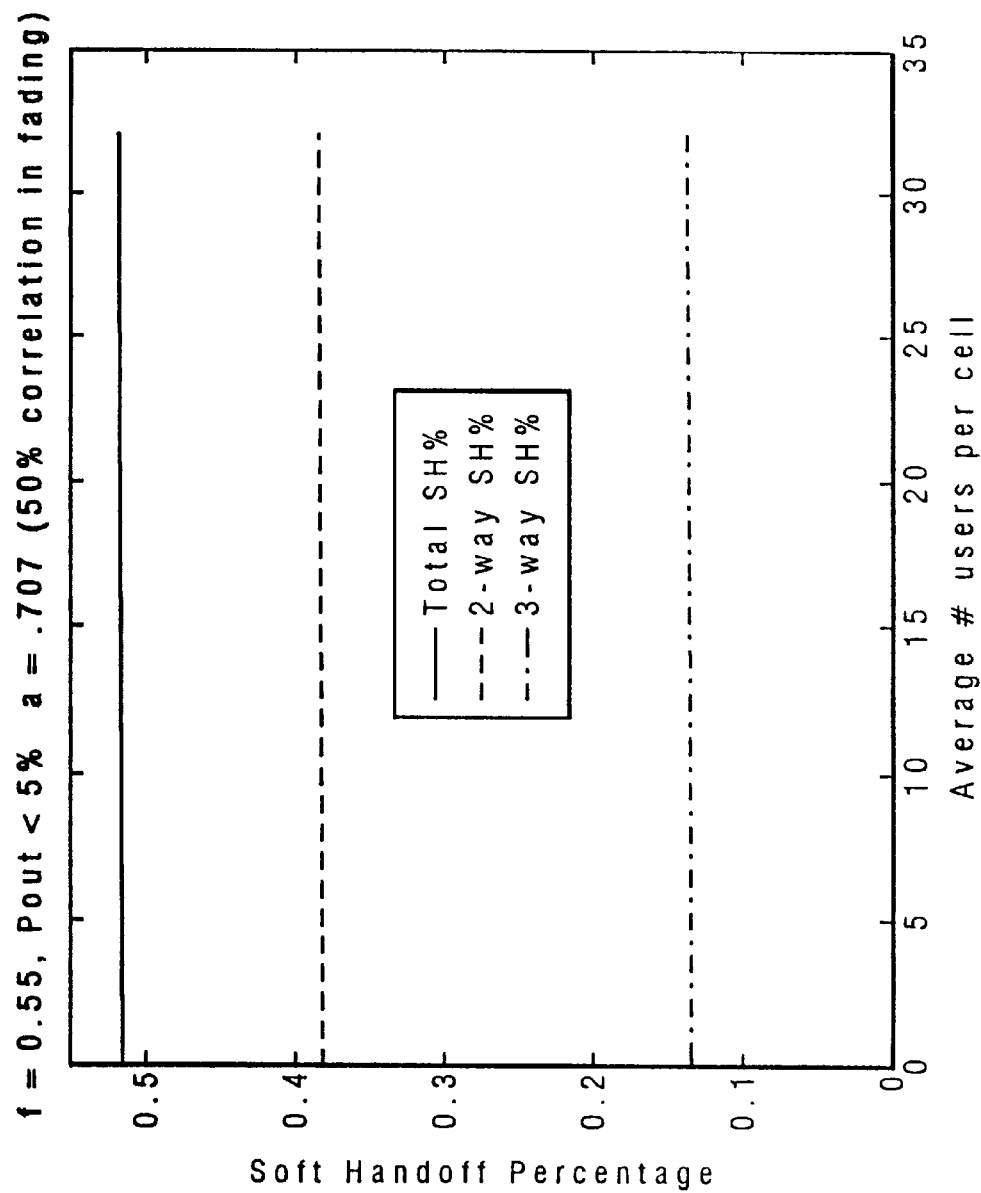

With reference now to FIGS. 7–9, diagrams illustrating results from cells designed are illustrated in accordance with a preferred embodiment of the present invention are illustrated. In FIGS. 7–9, results are presented for the radius of cells for capacity and coverage for different fading environments. These results provide different values for the radius of the cell for different loadings and different degrees of soft handoffs. Thus, the present invention provides an improved method and apparatus for designing cells. In particular, the present invention provides an improved method for designing soft handoff regions for cells. These soft handoff regions are designed to meet outage probability requirements in the cell by implementing cells designed in accordance with a preferred embodiment of the present invention and improve performance within a wireless communications system is achieved. Although the depicted examples focus on omni cells, the processes of the present invention also may be employed in designing sector cells, cells divided into different sectors.

Those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the preferred embodiment of the present invention has been presented for purposes of illustration and description, but is not intended to be exhaustive or limit the invention in the form disclosed. Many modifications and variations will be apparent to those of ordinary skill in the art. For example, although the depicted example employs a CDMA wireless communications system, the processes of the present invention and the cell designs created may be implemented in other types of wireless cellular communications system. Additionally, the cell design illustrated may be applied to sector cells. The embodiment was chosen and described in order to best explain the principles of the invention and the practical application to enable others of ordinary skill in the art to understand the invention for various embodiments with various modifications as are suited to the particular use contemplated.

What is claimed is:

1. A method for designing a soft handoff region in a wireless communications system comprising:

selecting an inner region for a cell within which a mobile station communicates only with a base station within the cell with a selected outage probability at an outer edge of the inner region; and selecting a soft handoff region for the cell with an outer edge and an inner edge defined by the outer edge of the inner region, wherein the mobile station communicates, within the soft handoff region, with the base station within the cell and with a base station within an adjacent cell with the selected outage probability.

2. The method of claim 1, further comprising:

defining an actual coverage region to equal an area within which the mobile station can communicate with the base station within the cell, the actual coverage region encompassing the inner region and the soft handoff region and having an edge touching an outer edge of an inner region within the adjacent cell.

3. The method of claim 2, wherein the inner region has a first radius defining the outer edge of the inner region, the soft handoff region has a second radius greater than the first radius defining the outer edge of the soft handoff region, and the actual coverage region has a third radius greater than the second radius defining the edge of the actual coverage region.

4. The method of claim 1, herein the soft handoff region is a soft handoff region in a sector.

5. A cell in a wireless communications system having a plurality of cells comprising:

an inner region for the cell within which a mobile station communicates only with a base station within the cell with a selected outage probability at an outer edge of the inner region; and a soft handoff region for the cell with an outer edge and an inner edge defined by the outer edge of the inner region, wherein the mobile station communicates, within the soft handoff region, with the base station within the cell and with a base station within an adjacent cell with the selected outage probability.

6. The cell of claim 5, further comprising:

an actual coverage area equal to an area within which the mobile station can communicate with the base station within the cell, the actual coverage area having an edge which touches an outer edge of an inner region within the adjacent cell.

7. A data processing system for designing a soft handoff region in a wireless communications system comprising:

first selection means for selecting an inner region for a cell within which a mobile station communicates only with a base station within the cell with a selected outage probability at an outer edge of the inner region; and second selection means for selecting a soft handoff region for the cell with an outer edge and an inner edge defined by the outer edge of the inner region, wherein the mobile station communicates, within the soft handoff region, with the base station within the cell and with a base station within an adjacent cell with the selected outage probability.

8. The data processing system of claim 7, further comprising:

third selection means defining an actual coverage region to equal an area within which the mobile station can communicate with the base station within the cell, the actual coverage region encompassing the inner region and the soft handoff region and having an edge touching an outer edge of an inner region within the adjacent cell.

9. The data processing system of claim 7, wherein the soft handoff region is a soft handoff region in an omni cell.

10. The data processing system of claim 7, herein the soft handoff region is a soft handoff region in a sector cell.

11. A method for designing a plurality of cells within a wireless communications system comprising:

specifying an inner region for each of the plurality of cells within which a mobile station communicates only with a base station within a respective cell with a desired outage probability; and specifying a soft handoff region for each of the plurality of cells within which the mobile station communicates with the base station within the respective cell and with a base station within an adjacent cell within the plurality of cells with the desired outage probability.

12. The method of claim 11, wherein each cell within the plurality of cells is identical in size to all other cells within the plurality of cells.

13. The method of claim 11, wherein the cells have different sizes.

14. The method of claim 11, wherein the step of specifying a soft handoff region for each of the plurality of cells within which the mobile station communicates with the base station within the respective cell and with a base station within an adjacent cell within the plurality of cells with the desired outage probability further comprises:

setting the soft handoff region for each of the plurality of cells based on cell coverage and capacity within the respective cell.

15. A method for designing regions for a cell within a wireless communications system, comprising:

determining a first radius defining an inner edge for a soft handoff region within a cell using coverage and capacity tradeoffs to achieve a desired outage probability at the inner edge for mobile stations within the cell communicating only with a base station within the cell; and determining a second radius defining an outer edge of the soft handoff region, wherein mobile stations within the soft handoff region communicate with the base station within the cell and with a base station within another, adjoining cell with the desired outage probability.

16. The method of claim 15, wherein the cell is a sector cell.

17. The method of claim 15, wherein the cell is an omni cell.

18. A computer program product for use with a computer for designing regions for a cell within a wireless communications system, the computer program product comprising:

a computer usable medium;

first instructions for determining a first radius defining an inner edge for a soft handoff region within a cell using coverage and capacity tradeoffs to achieve a desired outage probability at the inner edge for mobile stations within the cell communicating only with a base station within the cell; and second instructions for determining a second radius defining an outer edge of the soft handoff region, wherein mobile stations within the soft handoff region communicate with the base station within the cell and with a base station within another, adjoining cell with the desired outage probability.

wherein the instructions are embodied within the computer usable medium.

19. The computer program product of claim 18, wherein the computer usable medium is a hard disk drive.

20. The computer program product of claim 18, wherein the computer usable medium is a CD-ROM.

21. The computer program product of claim 18, wherein the computer usable medium is a random access memory.

* * * * *